United States Patent Office 3,739,001
Patented June 12, 1973

3,739,001
25,26-DIHYDROXYCHOLECALCIFEROL
Hector F. De Luca, Madison, Wis., assignor to Wisconsin Alumni Research Foundation, Madison, Wis.
No Drawing. Filed Oct. 22, 1971, Ser. No. 191,842
Int. Cl. C07c *171/08*
U.S. Cl. 260—397.2               1 Claim

ABSTRACT OF THE DISCLOSURE 25,26-dihydroxycholecalciferol and method for preparing same.

25,26-dihydroxycholecalciferol is characterized by its ability to induce intestinal calcium transport.

---

The invention described herein was made in the course of, or under, a grant from the National Institutes of Health, Department of Health, Education and Welfare.

This invention relates to a new compound which is characterized by its ability to induce calcium transport in the intestines.

More specifically, this invention relates to 25,26-dihydroxycholecalciferol (25,26-DHCC).

Various derivatives of vitamin D have been discovered during the past several years, e.g. 25-hydroxycholecalciferol (U.S. Letters Patent 3,565,924), 25-hydroxyergocalciferol (U.S. Letters Patent No. 3,585,221), 21,25-dihydroxycholecalciferol (Biochemistry 9, p. 2917 et seq. (1970)).

A new compound has now been found which has been identified as 25,26-dihydroxycholecalciferol and which is believed to be a further metabolite of 25-hydroxycholecalciferol. This new compound is characterized by vitamin D-like activity in that it stimulates intestinal calcium transport. This indicates that it would be a preferred agent for use in cases of chronic renal disease to stimulate absorption of calcium in the intestine without undesirable dissolution of bone. (See "25,26-dihydroxycholecalciferol, A Metabolite of Vitamin $D_3$ With Intestinal Calcium Transport Activity," T. Suda, H. F. DeLuca et al. Biochemistry, 9, 4776 (1970).)

ANALYTICAL PROCEDURES

The physical data recited in the following discussion were obtained as follows:

Ultraviolet spectra were recorded with a Beckman DB-G spectrophotometer. Samples were dissolved in ethanol. A molar extinction coefficient of 18,000 at 265 m$\mu$ was used for vitamin $D_3$. A molar extinction of 18,000 at 265 m$\mu$ was assumed for 25,26-DHCC as well. Mass spectra were determined with an MS–902 mass spectrometer manufactured by Associated Electrical Industries (electron energy, 70 ev.; ionizing current, 450 $\mu$a.; source temperature, 135–150° above ambient) using a direct introduction probe.

All radioactive determinations were carried out with a Packard Tri-Carb liquid scintillation spectrometer, Model 3003, equipped with an external standardization system. Samples of tritium determination were evaporated to dryness with a stream of air, dissolved in toluene-counting solution (2 g. of 2,5-diphenyloxazole and 100 mg. of 1,4-bis-2-(4-methyl-5-phenyloxacolyl)benzene per l. of toluene, and counted.

Acetylation reactions.—About 1 $\mu$g. of the derivative (25,26-DHCC metabolite) was allowed to stand at room temperature for approximately 5 hrs. in a solution of 5 $\mu$l. of acetic anhydride and 5 $\mu$l. of pyridine. The mass spectrum of the derivative was obtained by transferring the entire mixture to the probe tip and allowing the solvent to evaporate.

Silyl ether formation.—Complete silylation was accomplished by treating the derivative with about 10 $\mu$l. of silylating reagent (pyridine-hexamethyldisilazane-trimethylchlorosilane, 7:2:1, v./v.) for approximately 2 hrs.

Periodate cleavage.—To about 1.5 $\mu$g. of the derivative in 20 $\mu$l. of methanol a drop of 5% aqueous NaIO$_4$ was added. After 20 min. the solution was diluted with water and extracted with chloroform. The chloroform solution was concentrated to a few microliters which were transferred to the probe tip for mass spectral analysis.

ISOLATION

Eight pigs of mixed breed weighing 230–288 lbs. were fed a stock ration to which was added water-dispersible vitamin $D_3$ at a level of 31,000 IU/lb. of feed (Vitaplus Corp., Madison, Wis.). This supplied 250,000 IU of vitamin $D_3$ daily per pig. After 228 days the pigs were slaughtered and their blood was collected. It was immediately mixed with 0.1 volume of 0.1 M sodium oxalate to prevent clotting. Plasma was separated from the cells by means of a DeLaval blood separator (DeLaval Co.).

The 14.1 l. of plasma thus obtained was made 70% saturated with $(NH_4)_2SO_4$ and allowed to stand at 4° for 7 days. The precipitate was collected by centrifugation at 25,000 r.p.m. for 25 min. in a Sharples AS–16–P centrifuge. The protein precipitate was reextracted for 4 hrs. with the same volume of methanol-chloroform (2.1) and filtered. To the combined one-phase extracts were added an addition 13.2 l. of chloroform, 4 l. of tap water, and 200 ml. of saturated NaCl, and allowed to stand at 4° for 10 days. The chloroform phase was concentrated to 68 ml. with a rotary flash evaporator. This black oily residue was partitioned with 332 ml. of Skelly B (redistilled petroleum ether, B.P. 67°) and 400 ml. of 90% methanol-10% water in a separatory funnel. As later determined from the radioactive profile obtained by silicic acid column chromatography wherein the profile is obtained as a plot of radioactivity vs. volume of solvent effluent from the column (Ponchon and DeLuca, J. Nutr. 99, 157 (1969)), the upper phase contained less polar metabolites of vitamin $D_3$ (appearing as peaks on the radioactive profile and labeled peaks I–III) and the lower phase contained the more polar metabolites (peaks IV–VII). After separation of the phases, 300 ml. of chloroform and 100 ml. of tap water were added to the lower phase. The chloroform phase contained the polar metabolites and was drawn off. The aqueous phase was reextracted with 200 ml. of chloroform. The combined extracts were then taken to dryness with flash evaporator and dissolved in 20 ml. of chloroform.

Radiochemically pure [1,2-$^3$H] vitamin $D_3$ (specific activity 90,000 d.p.m./IU) was prepared by means of the method of Neville and DeLuca, Biochemistry 5, 2201 (1966). Chicks were used as a source of radioactive metabolites. Exactly 100 IU (2.5 $\mu$g.) of [1,2-$^3$H] vitamin $D_3$ was dosed intravenously to each of 51 chickens, which were maintained on a vitamin D deficient diet (Imrie et al., Arch. Biochem. Biophys. 120, 525 1967) for 27 days. After administration, they were fasted and 20 hrs. later blood was collected by decapitation giving 133 ml. of plasma after centrifugation. This was extracted with methanol-chloroform (2:1), and $^3$H-labeled polar metabolites were partitioned in a separatory funnel as described above. The metabolites partitioned in methanol were then extracted with chloroform. The chloroform was evaporated and the residue was dissolved in 5 ml. of chloroform. This $^3$H-labeled chicken plasma extract was first applied to a silicic acid column (Ponchon and De-Luca, supra) to obtained the $^3$H-labeled peak V material. The column was eluted with an ether-Skelly B-methanol gradient, obtained by running 500 ml. of 100% ether from a holding chamber into a 250 ml. constant-volume mixing chamber initially containing 250 ml. of 50% ether in Skelly B. Following the collection of 50 10-ml. fractions, 400 ml. of 5% methanol in ether was placed in the holding chamber, and an additional 40 10-ml. fractions were collected. After that, 400 ml. of 50% methanol in ether was then placed in the holding chamber, and an additional 40 10-ml. fractions were collected.

Peak V was eluted as a single peak, and 1,250,000 d.p.m. of radioactivity was recovered as peak V. This radioactive peak V taken from chicken plasma was then mixed with the extract from the hog plasma. The combined extract was then mixed with the extract from the hog plasma. The combined extract was then applied in 20 ml. of chloroform to a large 150-g., 60 cm., multibore silicic acid column measuring stepwise in diameter 1.0, 2.0, 3.0, and 4.0 cm. The column was eluted with the ether-Skelly B-methanol gradient as described above for chicken plasma extract except that 1 l. of 100% diethyl ether, 1 l. of 5% methanol in ether, and 1 l. of 50% methanol in ether were added successively to the holding chamber. Again, peak V was eluted as a single peak in the 5% methanol region. Peak V was next rechromatographed on a silicic acid (20 g.) column as described by Ponchon and DeLuca (supra) except that the mixing chamber contained 250 ml. of 50% diethyl ether in Skelly B and the holding chamber contained 500 ml. of 100% diethyl ether. As soon as the holding chamber became empty, it was filled with 400 ml. of 5% methanol in diethyl ether. Fractions of 10 ml. were collected. An elution profile indicated that the original peak V had been resolved into at least three components, which were designated Va, Vb, and Vc. The peak Va has been identified as 21,25-dihydroxycholecaliferol. The peak Vc collected in tubes 70–90 was then rechromatographed on a Celite partition column, especially designed for this metabolite by methods described by Johnson in Manometric Techniques, Umbreit, Burris and Stauffer, Ed. Minneapolis, Minn., Burgess, pp. 233–261 (1964) and constructed as follows: 300 ml. 90% methanol-10% water was equilibrated at 4° with 750 ml. of 80% Skelly B-20% chloroform. The aqueous methanol phase (15 ml.) was mixed with 20 g. of Celite and dry packed into a 60 x 1 cm. column in 2-cm. portions. The upper phase was used as the mobile phase. The column was developed with the mobile phase with 5.5-ml. fractions collected. The peak Vc has now been resolved into four peaks as shown by a radio-active profile on the column. The major peak $Vc_3$ (tubes 77–90) was then applied in 0.1 ml. of methanol to a 60 x 1 cm. Sephadex LH–20 column (Pharmacia Fine Chemicals Inc., Piscataway, N.J.) which was developed in methanol. Fractions (1 ml.) were collected. The ultraviolet spectrum of the material gave maximum absorption at 265 m$\mu$ and minimum absorption at 228 m$\mu$. A total of 40 $\mu$g. of the metabolite was isolated.

IDENTIFICATION

The ultraviolet spectrum of the metabolite which exhibited absorption at $$\lambda_{max.}^{EtOH} \ 265 \ m\mu$$

indicated an unchanged cis-triene chromophore (vitamin $D_3$ shows $\lambda_{max.}^{EtOH} \ 265 \ m\mu$)

Peaks at m/e 136 and 118 (136-$H_2O$) in the mass spectrum of the metabolite confirmed this assignment, since these ions are characteristic for the vitamin D triene system (see, for example, Blunt et al., Biochemistry 7, 3317 (1968) and Suda et al., Biochemistry, 8, 3515 (1969)). The molecular weght of 416 suggested the incorporation of two additional oxygen functions into the vitamins $D_3$ ring system; both of these had to be located in the side chain, since the peaks at m/e 271 and 253 (271-$H_2O$) which correspond to loss of the entire sidechain (cleavage of C-17–C-20 bond) in the mass spectrum of vitamin $D_3$ itself, are also present in the spectrum of the metabolite. The metabolite formed a diacetate (mol wt. 500) on treatment with acetic anhydride in pyridine, but a trimethylsilyl ether (mol wt. 632) resulted upon silylation of the compound. These transformations establish that both additional oxygen functionalities are present as hydroxy groupings and that one of these should be located on a tertiary carbon center. The exact structure of the compound followed from an intepretation of the mass spectra of the metabolite and its derivative. The metabolite spectrum in addition to peaks already discussed shows a peak at M–8–31 (367) suggesting the presence of a $CH_2OH$ group. Since the acetylation results suggested one tertiary hydroxyl function, the loss of 31 mass units pointed towards a 20,21- or 25,26-dhydroxylated side chain. The former possibility appeared unlikely since cleavage of the C-20–C-22 bond should be expected with elimination of the side chain fragment comprising carbons 22–27. (For example, 20-hydroxycholesterol shows a very intense peak at m/e 317 due to this cleavage.) The mass spectrum of the trisilyated metabolite confirmed a 25,26-substitution pattern. The relatively intense peak at m/e 529 corresponds to loss of 103 mass units [M—$CH_2OSi(CH_3)_3$] and the peak at m/e 219 can result by cleavage of the C-24–C-25 bond. The peak at m/e 208 corresponds to m/3 136 in the spectrum of the metabolite shifted by one silyl grouping. Further proof for the presence of a vicinal glycol grouping was provided by periodate cleavage of the metabolite which gave a compound of mol wt. 384 as expected for the transformation of a 25,26-dihydroxy compound to the corresponding 25-keto derivative. These data, therefore, establish the structure of this compound as 25,26-dihydroxycholecalciferol (25,26-DHCC).

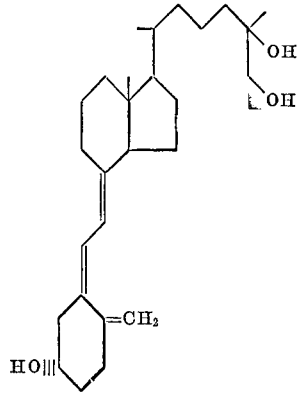

BIOLOGICAL ACTIVITY

Antirachitic activity

The line test assay of 25,26-DHCC was carried out in rats in accordance with the method described in U.S. Pharmacopoeia (Mack Publishing Co., Easton, Pa., 1955) except that it was given intrajugularly in 20 $\mu$l. of ethanol. 25,26-DHCC failed to show significant antirachitic activity, and therefore its antirachitic activity if any must be less than 4 IU/$\mu$g.

Serum calcium (bone mobilization) response and intestinal calcium transport

Bone mineral mobilizaton response to 25,26-DHCC, intravenously administered, was tested on rats as described in Blunt et al., Nat's. Acad. Sci. U.S. 61, 1503 (1968). In addition, intestines were removed from these rats and intestinal calcium transport was measured by the everted sac technique also described in Blunt et al., supra with the results shown in the table below.

TABLE 1

[Effect of intrajugular administration of 0.25μg. of 25, 26-DHCC and 25-HCC on calcium transport and serum calcium of rats on a low calcium diet]

| Group | Calcium transport $^{45}$Ca serosal/ $^{45}$Ca mucosal | Bone mobilization Serum Ca (mg. percent) |
|---|---|---|
| Control | 1.6±0.2[a] (4) | 4.7±0.1 (4) |
| 25, 26-DHCC | 2.8±0.6 (5) | 5.1±0.25 (5) |
| 25-HCC | 4.0±0.5 (3) | 6.6±0.6 (3) |

[a] Plus or minus shows standard deviation of the mean. Numbers in parentheses show number of animals tested in each group.

It is evident from the foregoing that 25,26-DHCC significantly increased intestinal calcium transport although it was not as effective in the amounts used as was 25-hydroxycholecalciferol. This indicates that 25,26-DHCC would be a preferred agent for use in chronic renal disease to induce transport and absorption of calcium in the intestine without dissolution of bone.

Having thus described the invention what is claimed is:

1. 25,26-dihydroxycholecalciferol.

No references cited.

ELBERT L. ROBERTS, Primary Examiner